United States Patent
Nishimura et al.

(10) Patent No.: US 10,703,394 B2
(45) Date of Patent: Jul. 7, 2020

(54) METHOD OF PRODUCING ELECTRODE-EQUIPPED PLATE SPRING OF RAILCAR BOGIE

(71) Applicant: KAWASAKI JUKOGYO KABUSHIKI KAISHA, Kobe-shi, Hyogo (JP)

(72) Inventors: Takehiro Nishimura, Kobe (JP); Yousuke Tsumura, Kobe (JP); Masayuki Mitsue, Kobe (JP); Teruhisa Nakaoka, Kakogawa (JP); Fumihide Inamura, Kakogawa (JP); Katsuyuki Kawashima, Akashi (JP); Akira Todoroki, Tokyo (JP); Yusuke Nishio, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 292 days.

(21) Appl. No.: 15/759,428

(22) PCT Filed: Sep. 7, 2016

(86) PCT No.: PCT/JP2016/004078
§ 371 (c)(1),
(2) Date: Mar. 12, 2018

(87) PCT Pub. No.: WO2017/043079
PCT Pub. Date: Mar. 16, 2017

(65) Prior Publication Data
US 2018/0257680 A1  Sep. 13, 2018

(30) Foreign Application Priority Data
Sep. 10, 2015 (JP) ................. 2015-178072

(51) Int. Cl.
*B61F 5/30* (2006.01)
*G01N 27/20* (2006.01)
(Continued)

(52) U.S. Cl.
CPC ............. *B61F 5/30* (2013.01); *B23K 26/082* (2015.10); *B23K 26/402* (2013.01); *B61F 5/302* (2013.01);
(Continued)

(58) Field of Classification Search
CPC .. F16F 1/368; B61F 5/30; B61F 5/302; B61F 5/32; Y02T 30/38
See application file for complete search history.

(56) References Cited

U.S. PATENT DOCUMENTS 6,305,297 B1   10/2001  Landrot
6,461,455 B1 *  10/2002  Meatto ................ B29C 35/0272
                                                         156/273.7
(Continued)

FOREIGN PATENT DOCUMENTS

JP  H06-47745 U    6/1994
JP  2001-318070 A  11/2001
(Continued)

*Primary Examiner* — Zachary L Kuhfuss
(74) *Attorney, Agent, or Firm* — Oliff PLC

(57) ABSTRACT

A method of producing an electrode-equipped plate spring of a railcar bogie includes: a resin removing step of partially irradiating a surface of fiber-reinforced resin, prepared by including electrically conductive fibers in resin, of a plate spring with a laser beam to partially remove the resin and partially expose the electrically conductive fibers; and an electrode forming step of attaching an electrode to an exposed region formed by partially exposing the electrically conductive fibers of the fiber-reinforced resin.

8 Claims, 5 Drawing Sheets

(51) Int. Cl.
*F16F 1/368* (2006.01)
*B23K 26/082* (2014.01)
*B23K 26/402* (2014.01)
*B61F 5/32* (2006.01)
*B61F 5/52* (2006.01)
*B23K 103/16* (2006.01)

(52) U.S. Cl.
CPC .............. *B61F 5/32* (2013.01); *B61F 5/523* (2013.01); *F16F 1/368* (2013.01); *G01N 27/20* (2013.01); *B23K 2103/172* (2018.08); *F16F 2226/023* (2013.01); *F16F 2230/24* (2013.01); *Y02T 30/38* (2013.01)

(56) References Cited

U.S. PATENT DOCUMENTS

| | | | |
|---|---|---|---|
| 6,660,114 B2 * | 12/2003 | Meatto | B29C 35/0272 |
| | | | 156/222 |
| 9,242,657 B2 * | 1/2016 | Nishimura | B61F 5/302 |
| 9,327,737 B2 * | 5/2016 | Nishimura | B61F 5/302 |
| 9,352,757 B2 * | 5/2016 | Nishimura | B61F 5/302 |
| 9,428,199 B2 * | 8/2016 | Kimura | F16F 1/368 |
| 9,493,174 B2 * | 11/2016 | Nishimura | B61F 5/50 |
| 9,527,516 B2 * | 12/2016 | Nishimura | B61F 5/32 |
| 9,573,604 B2 * | 2/2017 | Nishimura | B61F 5/52 |
| 9,663,121 B2 * | 5/2017 | Nishimura | B61F 5/52 |
| 9,688,292 B2 * | 6/2017 | Nishimura | B61F 3/04 |
| 9,802,627 B2 * | 10/2017 | Nishimura | B61F 5/52 |
| 9,845,098 B2 * | 12/2017 | Nishimura | B61F 5/52 |
| 9,855,959 B2 * | 1/2018 | Nishimura | B61F 5/14 |
| 9,868,179 B2 * | 1/2018 | Toyosawa | B01J 19/12 |
| 10,053,119 B2 * | 8/2018 | Nishimura | B61F 5/52 |
| 10,427,696 B2 * | 10/2019 | Nishimura | B61F 5/30 |
| 2015/0047529 A1 | 2/2015 | Nishimura et al. | |
| 2015/0076125 A1 | 3/2015 | Toyosawa et al. | |
| 2016/0200328 A1 | 7/2016 | Nishimura et al. | |
| 2018/0033222 A1 * | 2/2018 | Mitsue | B61F 5/30 |
| 2018/0141573 A1 * | 5/2018 | Tsumura | F16F 1/30 |
| 2018/0257680 A1 * | 9/2018 | Nishimura | B61F 5/302 |
| 2019/0291753 A1 * | 9/2019 | Ono | B61F 5/32 |
| 2019/0323997 A1 * | 10/2019 | Nishimura | B61F 5/30 |
| 2019/0329659 A1 * | 10/2019 | Tamura | B61F 5/30 |
| 2019/0375436 A1 * | 12/2019 | Tamura | B61F 5/30 |
| 2020/0047778 A1 * | 2/2020 | Kounoike | B61F 5/52 |

FOREIGN PATENT DOCUMENTS

| | | |
|---|---|---|
| JP | 2009-006497 A | 1/2009 |
| JP | 2010-528865 A | 8/2010 |
| JP | 5438796 B2 | 3/2014 |
| JP | 2015-000434 A | 1/2015 |
| TW | I458027 B | 10/2014 |
| WO | 2008/150913 A2 | 12/2008 |
| WO | 2009/031482 A1 | 3/2009 |
| WO | 2013/133415 A1 | 9/2013 |
| WO | 2015/052912 A1 | 4/2015 |

* cited by examiner

METHOD OF PRODUCING ELECTRODE-EQUIPPED PLATE SPRING OF RAILCAR BOGIE

TECHNICAL FIELD

The present invention relates to a method of producing an electrode-equipped plate spring of a railcar bogie, and particularly to a method of producing a plate spring to which an electrode for realizing monitoring of a state of the plate spring is attached.

BACKGROUND ART

Proposed is a railcar bogie from which side sills are omitted in such a manner that: each of plate springs extends between front and rear axle boxes; and longitudinal direction middle portions of the plate springs support a cross beam (see PTL 1). To be specific, in this bogie, the plate spring achieves the function of a suspension and the function of a conventional side sill. To reduce the weight of the bogie, the plate springs are formed by using fiber-reinforced resin.

While the bogie is traveling, loads are repeatedly applied to the plate springs. Therefore, regarding the plate springs that have been used for a long period of time, attention to strength deterioration by fatigue is necessary. Here, realizing simple monitoring of the state of the plate spring itself is useful for an improvement of maintenance efficiency of the bogie. For example, PTL 2 discloses a technique in which: a plurality of electrodes are arranged at predetermined intervals on one of surfaces of a composite material made of CFRP; and abnormality of the composite material is detected from a change in electrical resistance measured based on current flowing between the electrodes.

CITATION LIST

Patent Literature

PTL 1: Japanese Patent No. 5438796
PTL 2: Japanese Laid-Open Patent Application Publication No. 2001-318070

SUMMARY OF INVENTION

Technical Problem

When providing the electrode on the surface of the CFRP, carbon fibers having electrical conductivity are exposed by removing resin of the surface of the CFRP, and the electrode is then attached. In this case, if work of scraping the resin by polishing is inadequate, unnecessary resin remains, and electrical conduction between the electrode and the carbon fibers becomes incomplete. In contrast, if the resin is scraped too much, the carbon fibers are cut, and a contact state between the electrode and the carbon fibers easily changes. Thus, measured values vary.

An object of the present invention is to maintain stable quality of a fiber-reinforced resin plate spring for use in a railcar bogie by, when attaching an electrode to the plate spring, stably bringing the electrode into electrically conductive contact with electrically conductive fibers.

Solution to Problem

A method of producing an electrode-equipped plate spring of a railcar bogie according to one aspect of the present invention includes: a resin removing step of partially irradiating a surface of fiber-reinforced resin, prepared by including electrically conductive fibers in resin, of a plate spring with a laser beam to partially remove the resin and partially expose the electrically conductive fibers; and an electrode forming step of attaching an electrode to an exposed region formed by partially exposing the electrically conductive fibers of the fiber-reinforced resin.

According to the above method, the electrically conductive fibers are partially exposed by partially removing the resin using the laser beam. Therefore, by managing the output of the laser beam and the like, the exposed region of the fiber-reinforced resin can be stably and accurately formed, and individual variations can be reduced. Then, by attaching the electrode to the exposed region of the fiber-reinforced resin, the electrode can be stably brought into electrically conductive contact with the electrically conductive fibers, and variations in measured values can be reduced. Therefore, the quality of the electrode-equipped plate spring made of the fiber-reinforced resin can be stabilized.

Advantageous Effects of Invention

According to the present invention, stable quality of a fiber-reinforced resin plate spring for use in a railcar bogie can be maintained by, when attaching an electrode to the plate spring, stably bringing the electrode into electrically conductive contact with electrically conductive fibers.

DESCRIPTION OF EMBODIMENTS

Hereinafter, an embodiment will be explained in reference to the drawings. In the following explanations, a direction in which a railcar travels and in which a carbody extends is defined as a car longitudinal direction, and a crosswise direction perpendicular to the car longitudinal direction is defined as a car width direction. The car longitudinal direction is also referred to as a forward/rearward direction, and the car width direction is also referred to as a leftward/rightward direction. To be specific, the railcar can travel in both directions along the car longitudinal direction, but if the railcar travels in one direction, this traveling direction may be referred to as a forward direction, and a direction opposite to the traveling direction may be referred to as a rearward direction.

Figure 1:
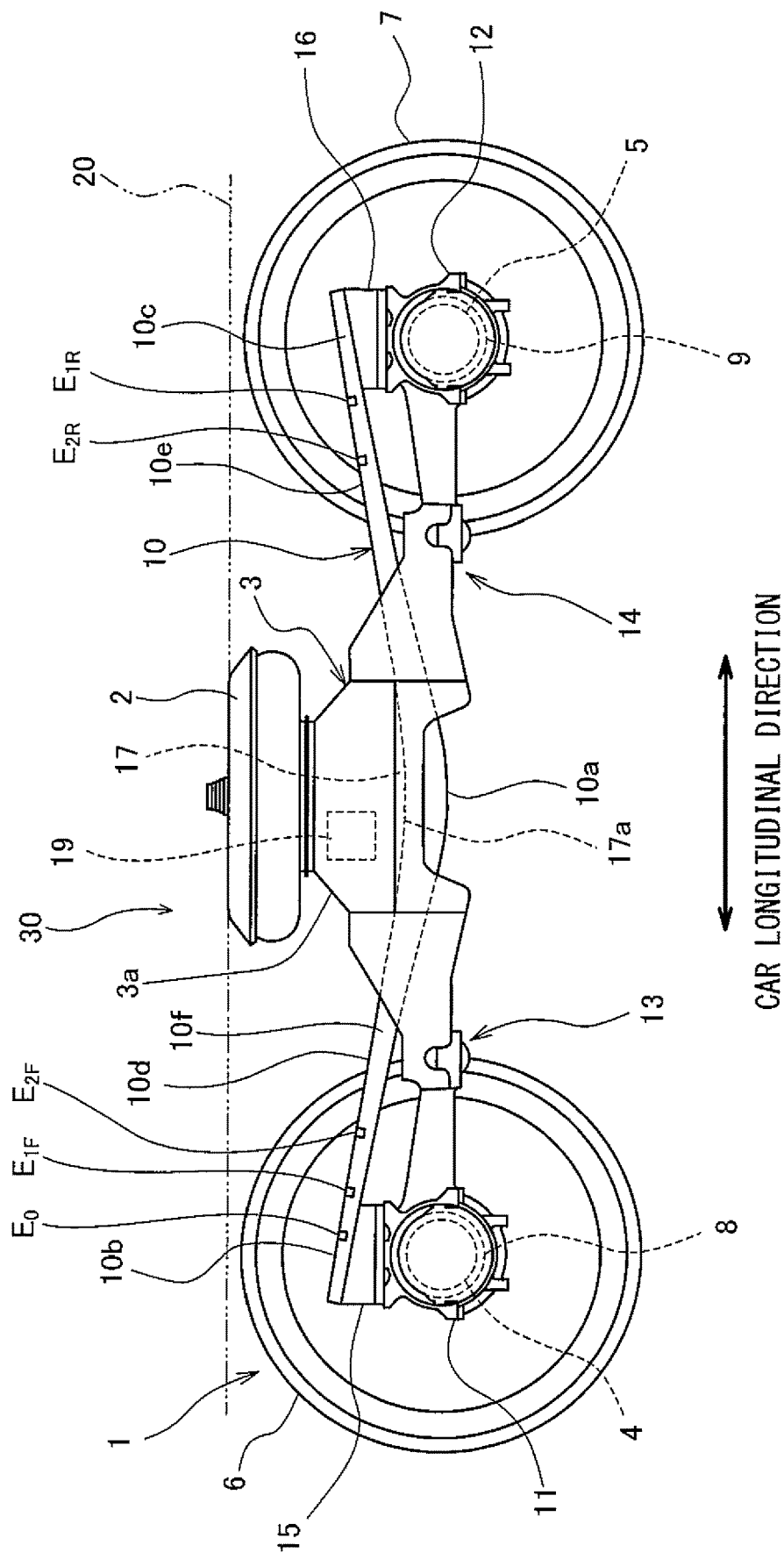
FIG. 1 is a side view of a railcar bogie including an electrode-equipped plate spring according to an embodiment.

FIG. 1 is a side view of a railcar bogie 1 including an electrode-equipped plate spring 10 according to the embodiment. As shown in FIG. 1, the bogie 1 includes a bogie frame 3 supporting a carbody 20 through air springs 2 that are secondary suspensions. The bogie frame 3 includes a cross beam 3a extending in the car width direction but does not include side sills extending from both respective car width direction end portions of the cross beam 3a in the car longitudinal direction. The air springs 2 are provided on an upper surface of the cross beam 3a. Axles 4 and 5 extending in the car width direction are arranged at both respective car longitudinal direction sides of the cross beam 3a. Wheels 6 are fixed to both respective car width direction sides of the axle 4, and wheels 7 are fixed to both respective car width direction sides of the axle 5.

Bearings 8 rotatably supporting the axle 4 are provided at both respective car width direction end portions of the axle 4 so as to be located outside the respective wheels 6 in the car width direction, and the bearings 8 are accommodated in respective axle boxes 11. Similarly, bearings 9 rotatably supporting the axle 5 are provided at both respective car width direction end portions of the axle 5 so as to be located outside the respective wheels 7 in the car width direction, and the bearings 9 are accommodated in respective axle boxes 12. Each of the car width direction end portions of the cross beam 3a is coupled to the axle box 11 by an axle beam type coupling mechanism 13 and also coupled to the axle box 12 by an axle beam type coupling mechanism 14. Each of the electrode-equipped plate springs 10 extending in the car longitudinal direction is provided between the cross beam 3a and the axle box 11 and between the cross beam 3a and the axle box 12. Longitudinal direction middle portions 10a of the plate springs 10 elastically support the respective car width direction end portions of the cross beam 3a from below. A longitudinal direction end portion 10b of the plate spring 10 is supported by the axle box 11, and a longitudinal direction end portion 10c of the plate spring 10 is supported by the axle box 12. To be specific, the plate spring 10 achieves the function of a primary suspension and the function of a conventional side sill.

Pressing members 17 each having a circular-arc lower surface 17a are provided at respective lower portions of the car width direction end portions of the cross beam 3a. Each of the pressing members 17 is placed on the middle portion 10a of the plate spring 10 from above and contacts the middle portion 10a so as to be separable from the middle portion 10a. To be specific, the pressing member 17 contacts an upper surface of the plate spring 10 and presses the upper surface from above by a downward load, applied from the cross beam 3a by gravity, so as not to fix the plate spring 10 in an upward/downward direction relative to the pressing member 17. Further, supporting members 15 and 16 are attached to upper end portions of the axle boxes 11 and 12, respectively. The end portion 10b of the plate spring 10 is supported by the axle box 11 from below through the supporting member 15, and the end portion 10c of the plate spring 10 is supported by the axle box 12 from below through the supporting member 16. Upper surfaces of the supporting members 15 and 16 are inclined toward a middle side in the car longitudinal direction. The end portion 10b of the plate spring 10 is placed on the supporting member 15 from above, and the end portion 10c of the plate spring 10 is placed on the supporting member 16 from above.

By this configuration, the load from the carbody 20 is transmitted to the middle portions of the plate springs 10 through the pressing members 17 provided at the respective lower portions of the car width direction end portions of the cross beam 3a. Further, when a height difference between the front and rear wheels 6 and 7 is generated by, for example, irregularities of a railway track, the plate spring 10 rotates relative to the pressing member 17 like a seesaw to prevent a decrease of a wheel load. As above, while the bogie is traveling, loads are repeatedly applied to the plate springs 10.

An intermediate portion 10d that is an intermediate region between the middle portion 10a and the end portion 10b in the plate spring 10 and an intermediate portion 10e that is an intermediate region between the middle portion 10a and the end portion 10c in the plate spring 10 are separated from other members and arranged in a free state in the air. To be specific, deformation and displacement of the intermediate portions 10d are 10e are not restricted. Therefore, according to the plate spring 10, the intermediate portions 10d and 10e elastically deform using the middle portion 10a and the end portions 10b and 10c as fulcrums. In a side view, the intermediate portions 10d and 10e of the plate spring 10 are inclined downward toward the middle portion 10a, and the middle portion 10a of the plate spring 10 is located lower than the end portions 10b and 10c of the plate spring 10. To be specific, in a side view, the plate spring 10 is formed in a bow shape that is convex downward as a whole. The plate spring 10 has such a shape that the thickness thereof gradually decreases from the middle portion 10a toward each of the end portions 10b and 10c. Hereinafter, for convenience of explanation, a leftward direction in FIG. 1 is defined as a traveling direction. The wheel 6 is referred to as a front wheel, and the wheel 7 is referred to as a rear wheel.

Each of electrode pairs $E_0$, $E_{1F}$, $E_{2F}$, $E_{1R}$, and $E_{2R}$ is provided on both width direction side end surfaces 10f of the plate spring 10, a width direction being perpendicular to the longitudinal direction and thickness direction of the plate spring 10. Each of the electrode pairs $E_0$, $E_{1F}$, $E_{2F}$, $E_{1R}$, and $E_{2R}$ sandwiches the plate spring 10 in the width direction. When viewed from the middle portion 10a of the plate spring 10, the electrode pairs $E_0$, $E_{1F}$, and $E_{2F}$ are arranged close to the front wheel 6, and the electrode pairs $E_{1R}$ and $E_{2R}$ are arranged close to the rear wheel 7. A set of the electrode pairs $E_{1F}$ and $E_{2F}$ and a set of the electrode pairs $E_{1R}$ and $E_{2R}$ are arranged symmetrically with respect to a longitudinal direction center of the plate spring 10. A monitoring control unit 19 electrically connected to the electrode pairs $E_0$, $E_{1F}$, $E_{2F}$, $E_{1R}$, and $E_{2R}$ through electric wires is mounted on the bogie frame 3. A state monitoring device 30 includes the plate springs 10, the electrode pairs $E_0$, $E_{1F}$, $E_{2F}$, $E_{1R}$, and $E_{2R}$, and the monitoring control unit 19. It should be noted that the configurations of the electrode pairs $E_0$, $E_{1F}$, $E_{2F}$, $E_{1R}$, and $E_{2R}$ themselves are the same as one another, and methods of forming the electrode pairs $E_0$, $E_{1F}$, $E_{2F}$, $E_{1R}$, and $E_{2R}$ themselves are the same as one another. Therefore, the following will mainly explain the electrode pair $E_{1F}$.

Figure 2:
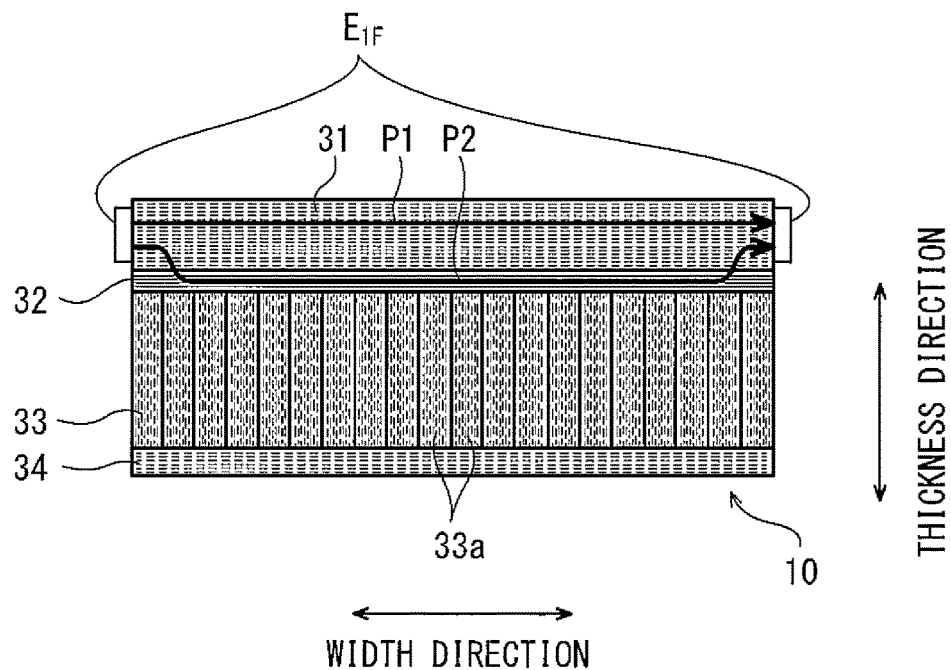
FIG. 2 is a sectional view when viewed from a longitudinal direction of the plate spring shown in FIG. 1.
Figure 3:
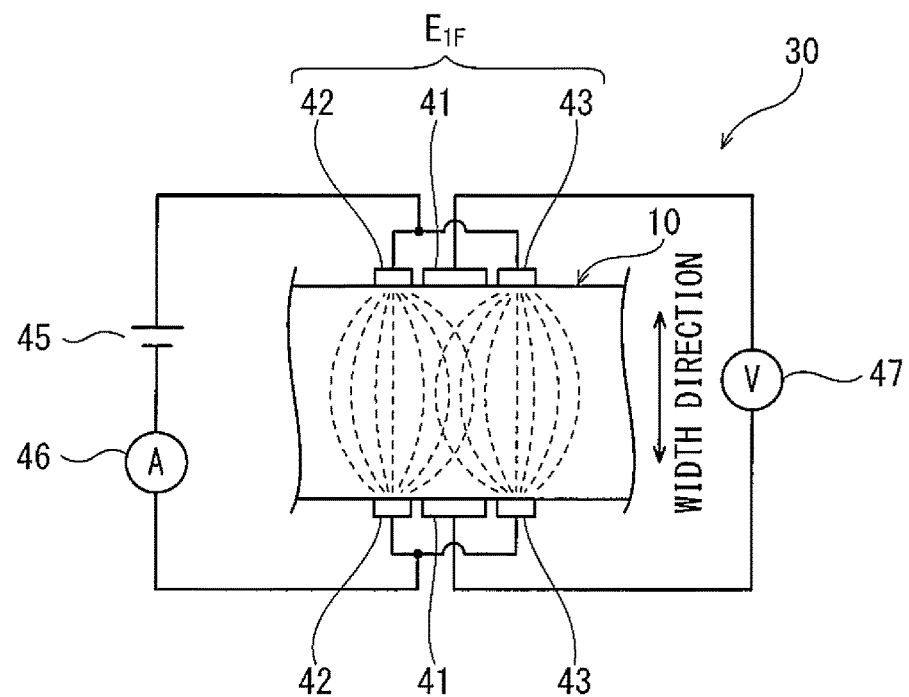
FIG. 3 is a conceptual diagram for explaining a principle of monitoring a state of the plate spring shown in FIG. 1.

FIG. 2 is a sectional view when viewed from the longitudinal direction of the plate spring 10 shown in FIG. 1. FIG. 3 is a conceptual diagram for explaining a principle of monitoring a state of the plate spring 10 shown in FIG. 1. As shown in FIGS. 2 and 3, the plate spring 10 is formed by laminating a plurality of fiber-reinforced resin layers and is molded by using a typical composite material molding technique, such as autoclave molding. In the present embodiment, the plate spring 10 includes a first fiber-reinforced resin layer 31, a second fiber-reinforced resin layer 32, a third fiber-reinforced resin layer 33, and a fourth fiber-reinforced resin layer 34. The first fiber-reinforced resin layer 31, the second fiber-reinforced resin layer 32, the third fiber-reinforced resin layer 33, and the fourth fiber-reinforced resin layer 34 are provided in this order from an upper side to a lower side. The third fiber-reinforced resin layer 33 is formed such that the thickness thereof gradually decreases from a longitudinal direction middle portion thereof to each of end portions thereof. The thickness of the first fiber-reinforced resin layer 31, the thickness of the second fiber-reinforced resin layer 32, and the thickness of the fourth fiber-reinforced resin layer 34 are constant.

The first fiber-reinforced resin layer 31, the second fiber-reinforced resin layer 32, and the fourth fiber-reinforced resin layer 34 contain fibers having electrical conductivity. In the present embodiment, fiber-reinforced resin of the first fiber-reinforced resin layer 31, the second fiber-reinforced resin layer 32, and the fourth fiber-reinforced resin layer 34 includes resin having a light transmission property and electrically conductive fibers having a light absorption property. In the fiber-reinforced resin of the fiber-reinforced resin layers 31, 32, and 34, a thermal decomposition temperature of the resin is lower than a thermal decomposition temperature of the electrically conductive fibers. The electrically conductive fibers of the fiber-reinforced resin of the fiber-reinforced resin layers 31, 32, and 34 are nontransparent and have a non-reflective property. As one example, in the fiber-reinforced resin of the fiber-reinforced resin layers 31, 32, and 34, the electrically conductive fibers are black carbon fibers, and the resin is epoxy resin that transmits light. To be specific, the first fiber-reinforced resin layer 31, the second fiber-reinforced resin layer 32, and the fourth fiber-reinforced resin layer 34 are formed by CFRP containing continuous carbon fibers.

The first fiber-reinforced resin layer 31 and the fourth fiber-reinforced resin layer 34 contain carbon fibers continuously extending from one longitudinal direction end of the plate spring 10 to the other longitudinal direction end of the plate spring 10 when viewed from a normal direction of a main surface (an upper surface or a lower surface) of the plate spring 10. To be specific, each of the first fiber-reinforced resin layer 31 and the fourth fiber-reinforced resin layer 34 mainly includes a unidirectional material as a laminate component, the unidirectional material being a material in which carbon fibers are oriented in one direction along the longitudinal direction of the plate spring 10. The second fiber-reinforced resin layer 32 includes a material containing carbon fibers that are continuous from one width direction end of the plate spring 10 to the other width direction end of the plate spring 10 when viewed from the normal direction of the main surface (the upper surface or the lower surface) of the plate spring 10. To be specific, the second fiber-reinforced resin layer 32 mainly includes, for example, a unidirectional material or a textile material as a laminate component, the unidirectional material being a material in which carbon fibers are oriented in one direction along the width direction of the plate spring 10, the textile material being a material in which carbon fibers are oriented in lengthwise and crosswise directions. The third fiber-reinforced resin layer 33 is formed by FRP containing electrically nonconductive reinforced fibers. As one example, the third fiber-reinforced resin layer 33 is formed by GFRP containing glass fibers.

As described above, the first fiber-reinforced resin layer 31, the second fiber-reinforced resin layer 32, and the fourth fiber-reinforced resin layer 34 contain the electrically conductive fibers, and the third fiber-reinforced resin layer 33 does not contain the electrically conductive fibers but contains the electrically nonconductive fibers. To be specific, a boundary between layers containing electrically conductive fibers is a boundary between the first fiber-reinforced resin layer 31 and the second fiber-reinforced resin layer 32. The electrode pair $E_{1F}$ is directly attached to both width direction side end surfaces of the first fiber-reinforced resin layer 31. Specifically, after the carbon fibers are partially exposed by removing the resin at predetermined portions on both width direction side end surfaces of the first fiber-reinforced resin layer 31, the electrode pair $E_{1F}$ is attached to these portions. In the present embodiment, the electrode pair $E_{1F}$ is located away from the second fiber-reinforced resin layer 32.

As electrically conductive paths of current flowing through the electrode pair $E_{1F}$, there are a first electrically conductive path P1 and a second electrically conductive path P2 as schematically shown by thick arrows in FIG. 2. The first electrically conductive path P1 is formed only by the carbon fibers of the first fiber-reinforced resin layer 31, and the second electrically conductive path P2 is formed so as to extend through both the carbon fibers of the first fiber-reinforced resin layer 31 and the carbon fibers of the second fiber-reinforced resin layer 32. The first fiber-reinforced resin layer 31 is the unidirectional material and hardly contains continuous fibers continuously extending from one width direction end to the other width direction end. Therefore, the first electrically conductive path P1 is formed in such a manner that a large number of carbon fibers of the first fiber-reinforced resin layer 31 are provided adjacent to one another and contact one another. On this account, the first electrically conductive path P1 has an irregular route extending in the longitudinal direction and width direction of the plate spring 10.

The second electrically conductive path P2 is formed by the carbon fibers of one width direction end portion of the first fiber-reinforced resin layer 31, the carbon fibers of the second fiber-reinforced resin layer 32, and the carbon fibers of the other width direction end portion of the first fiber-reinforced resin layer 31. To be specific, the second electrically conductive path P2 extends through the boundary between the first fiber-reinforced resin layer 31 and the second fiber-reinforced resin layer 32 by the contact between the carbon fibers of the first fiber-reinforced resin layer 31 and the carbon fibers of the second fiber-reinforced resin layer 32. The carbon fibers of the second fiber-reinforced resin layer 32 contains continuous fibers continuously extending from one width direction end of the plate spring 10 to the other width direction end of the plate spring 10. Therefore, the current can flow in the width direction of the plate spring 10 through the electrically conductive path of the second fiber-reinforced resin layer 32 which path is shorter in distance than the electrically conductive path of the first fiber-reinforced resin layer 31. On this account, electrical resistance of the second fiber-reinforced resin layer 32 to the current flowing in the width direction is smaller than electrical resistance of the first fiber-reinforced resin layer 31 to the current flowing in the width direction. Thus, when the current flows through the electrode pair $E_{1F}$, the current flowing through the second electrically conductive path P2 is larger than the current flowing through the first electrically conductive path P1.

As above, the second electrically conductive path P2 through which a large amount of current flows extends through the boundary between the first fiber-reinforced resin layer 31 and the second fiber-reinforced resin layer 32. Therefore, if the delamination occurs between the first fiber-reinforced resin layer 31 and the second fiber-reinforced resin layer 32, a sectional area of the second electrically conductive path P2 decreases, so that the electrical resistance of the second electrically conductive path P2 significantly changes. On this account, when a resistance value of the plate spring 10 which value is obtained by supplying the current to the electrode pair $E_{1F}$ significantly increases, it can be determined that the delamination has occurred. Further, regarding the first electrically conductive path P1, if the delamination occurs in the first fiber-reinforced resin layer 31, that is, the adjacent fibers contacting each other in the first fiber-reinforced resin layer 31 are separated from each other, a sectional area of the first electrically conductive path P1 decreases, so that the electrical resistance of the first electrically conductive path P1 changes. On this account, this delamination can also be detected by monitoring the increase in the resistance value of the plate spring 10, the resistance value being obtained by supplying the current to the electrode pair $E_{1F}$.

The electrode pair $E_{1F}$ is constituted by: a middle electrode element pair 41 for voltage measurement; and side electrode element pairs 42 and 43 for power supply, the pairs 42 and 43 being arranged at both respective sides of the middle electrode element pair 41 in the longitudinal direction of the plate spring 10 so as to be spaced apart from the middle electrode element pair 41. Each of the electrode element pairs 41 to 43 is formed in such a shape as to extend in a thickness direction of the first fiber-reinforced resin layer 31. The side electrode element pairs 42 and 43 are short-circuited to each other and connected to a circuit including a power supply 45 and a current sensor 46. The power supply 45 supplies constant current I to the side electrode element pairs 42 and 43. The middle electrode element pair 41 is connected to a circuit including a voltage sensor 47. To be specific, the voltage sensor 47 detects a voltage of the middle electrode element pair 41. The state monitoring device 30 includes: the power supply 45 configured to supply the constant current to the side electrode element pairs 42 and 43; and the voltage sensor 47 configured to detect the voltage of the middle electrode element pair 41. Distribution (shown by broken lines in FIG. 3) of the current supplied to each of the side electrode element pairs 42 and 43 spreads to some extent in the longitudinal direction of the plate spring 10. Therefore, the current concentrates on a portion of the plate spring 10, the portion being sandwiched by the middle electrode element pair 41. Therefore, a change in the voltage of the middle electrode element pair 41 is stably detected by the voltage sensor 47.

Figure 4:
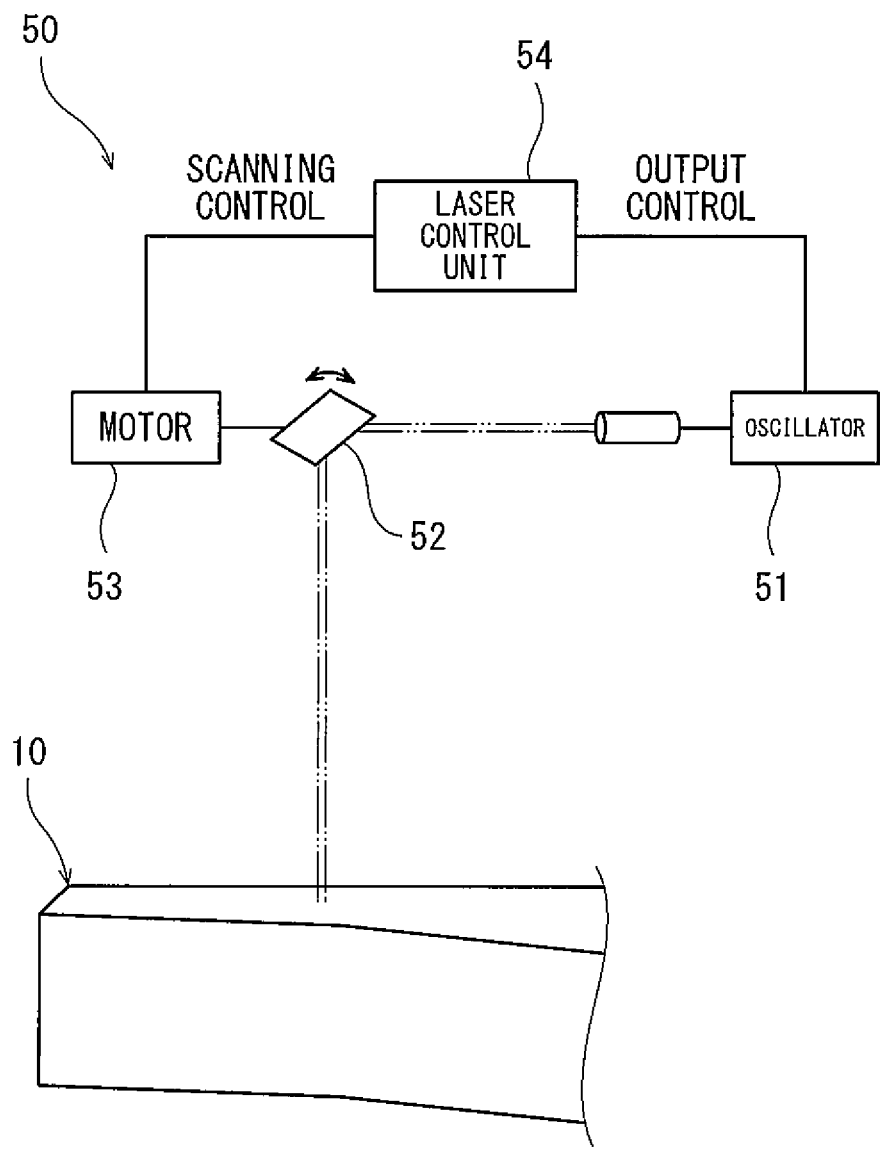
FIG. 4 is a block diagram of a laser device configured to irradiate the plate spring with a laser beam.

FIG. 4 is a block diagram of a laser device 50 configured to irradiate the plate spring 10 with a laser beam. As shown in FIG. 4, the laser device 50 includes a laser oscillator 51, a mirror 52, a motor 53, and a laser control unit 54 and irradiates the plate spring 10 with the laser beam. The laser oscillator 51 generates and outputs the laser beam. The mirror 52 (galvanometer mirror, for example) reflects the laser beam, output from the laser oscillator 51, toward a target position of the plate spring 10. The motor 53 drives the mirror 52 to adjust an angle of the mirror 52 and thereby adjust a reflection direction of the laser beam. The laser control unit 54 controls the laser oscillator 51 to control intensity of the laser beam (output control). The laser control unit 54 controls the motor 53 to control a scanning direction and scanning speed of the laser beam (scanning control).

Figure 5A:
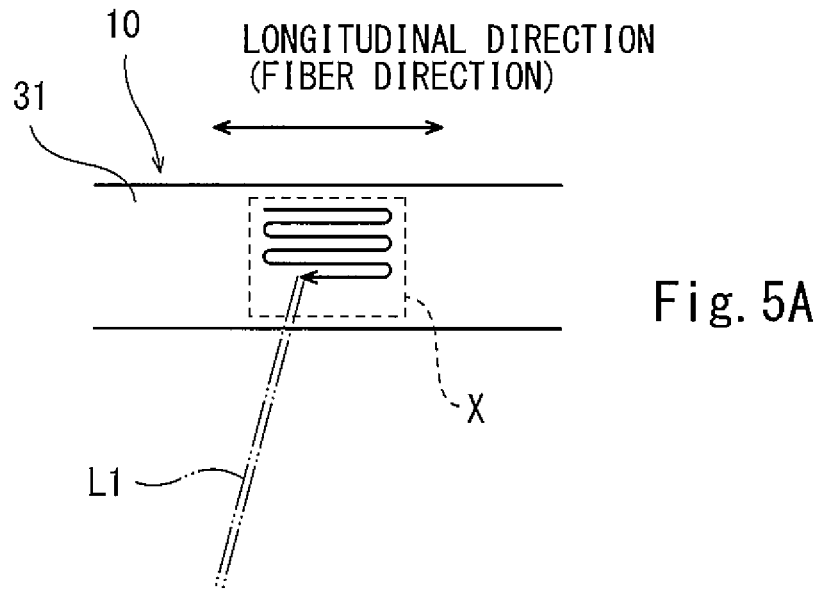
FIGS. 5A to 5C are diagrams for explaining a procedure of providing an electrode at the plate spring.
Figure 5B:
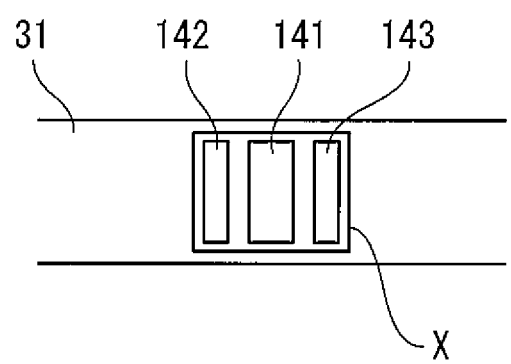
Figure 5C:
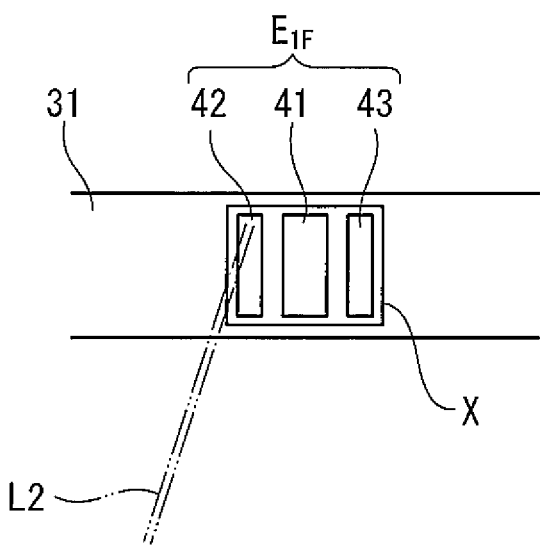
Figure 6:
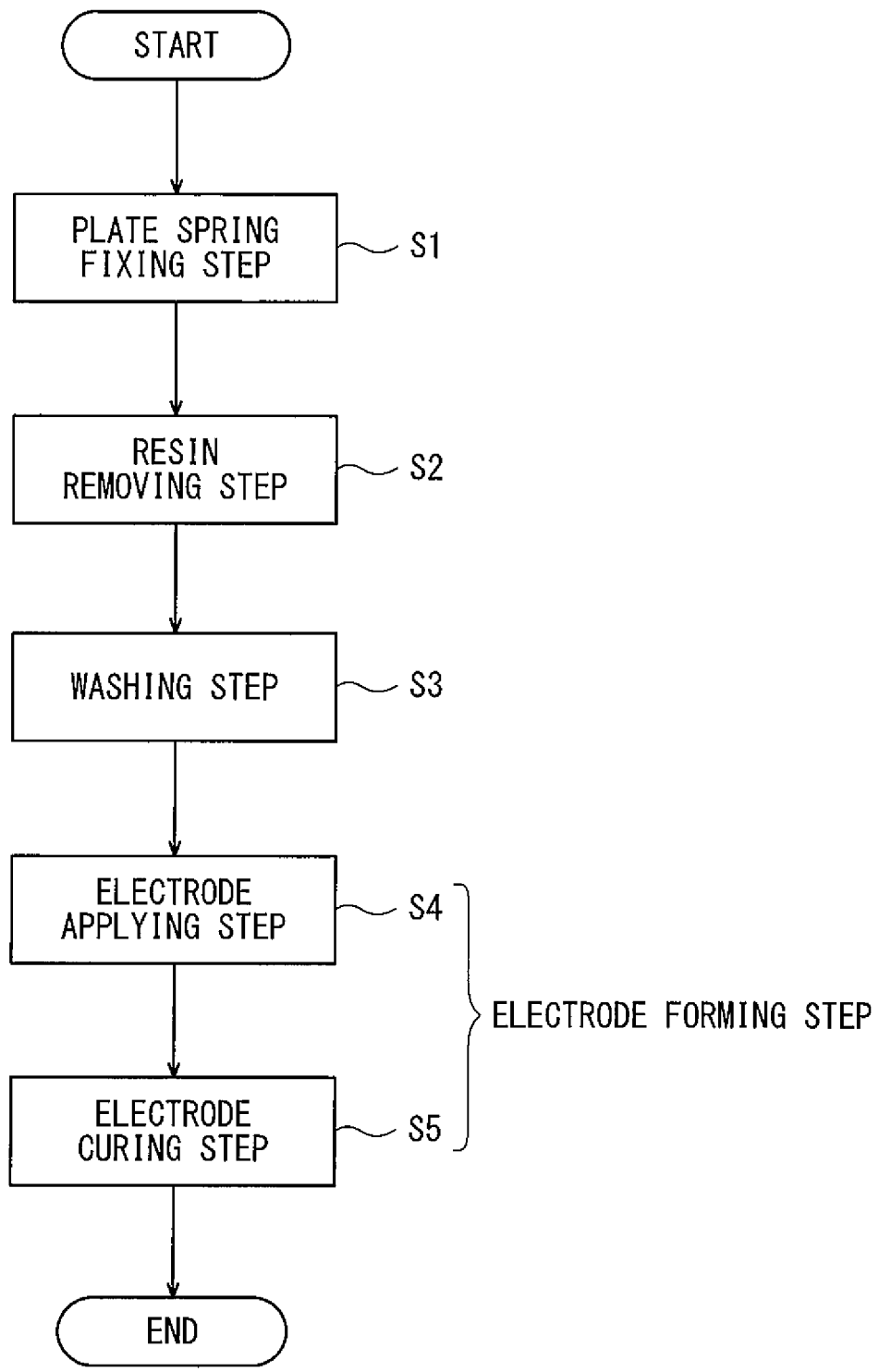
FIG. 6 is a flow chart for explaining the procedure of providing the electrode at the plate spring.

FIGS. 5A to 5C are diagrams for explaining a procedure of providing the electrode pair $E_{1F}$ at the plate spring 10. FIG. 6 is a flow chart for explaining the procedure of providing the electrode pair $E_{1F}$ at the plate spring 10. As shown in FIG. 6, first, the plate spring 10 is fixed to a jig (not shown), and the plate spring 10 is positioned relative to the laser device 50 (Step S1: plate spring fixing step). Next, as shown in FIGS. 5A and 6, by irradiating a target portion of the side end surface of the first fiber-reinforced resin layer 31 of the plate spring 10 with a laser beam L1, the resin on the surface of the target portion is removed, and thus, an exposed region X formed by partially exposing the carbon fibers is formed (Step S2: resin removing step). In the present embodiment, the exposed region X is formed only on the side end surface of the first fiber-reinforced resin layer 31. As one example, the exposed region X is formed in a rectangular shape in a side view of the plate spring 10. When forming the exposed region X using the laser beam L1, the output and scanning speed of the laser beam L1 of the laser device 50 are managed by the laser control unit 54. With this, the exposed region X of the fiber-reinforced resin can be stably and accurately formed, and individual variations are reduced.

In the first fiber-reinforced resin layer 31 of the plate spring 10, the resin has the light transmission property, and the carbon fibers have the light absorption property. Therefore, in the resin removing step, the carbon fibers absorb the laser beam L1, having passed through the resin, to generate heat, so that the resin around the heat-generating carbon fibers can be removed by the heat. On this account, the irradiation of the laser beam L1 does not have to avoid the carbon fibers. Thus, the irradiation of the laser beam L1 can be simplified, and the producibility improves.

In the resin removing step, when viewed from an irradiation direction of the laser beam L1 (i.e., in a side view of the plate spring 10), the laser beam L1 scans in an extending direction of the carbon fibers (i.e., in the longitudinal direction of the plate spring 10). With this, as compared to a case where the laser beam scans in a direction perpendicular to the extending direction of the carbon fiber (i.e., in the thickness direction of the plate spring 10) when viewed from the irradiation direction of the laser beam L1, the resin can be removed by quickly increasing the temperatures of the individual carbon fibers, and heat load can be prevented from being repeatedly applied to the individual carbon fibers and thereby the carbon fibers can be prevented from deteriorating (for example, from being cut).

Next, the exposed region X of the side end surface of the first fiber-reinforced resin layer 31 of the plate spring 10 is washed using a cleaning liquid (for example, acetone) for subsequent steps (Step S3: washing step). Next, as shown in FIGS. 5B and 6, thermosetting electrically conductive inks 141, 142, and 143 are applied to the washed exposed region X by screen printing (Step S4: electrode applying step). Next, as shown in FIGS. 5C and 6, the laser device 50 irradiates the applied electrically conductive inks 141, 142, and 143 with a laser beam L2, and with this, the electrically conductive inks 141, 142, and 143 are cured to form the electrode element pairs 41 to 43 (electrode pair $E_{1F}$) (Step S5: electrode curing step). To be specific, in the present embodiment, an electrode forming step includes the electrode applying step and the electrode curing step. Since the laser beam L2 of the laser device 50 is used also in the electrode curing step, it is unnecessary to use a thermostatic tank or the like, and therefore, equipment can be simplified. Further, since the common laser device 50 is used in both the resin removing step and the electrode curing step, the work efficiency improves, and the cost can be reduced.

Further, in this case, the laser control unit 54 controls the laser oscillator 51 and the motor 53 such that energy per unit area of the laser beam L2 with which the electrically conductive inks 141, 142, and 143 are irradiated in the electrode curing step is smaller than energy per unit area of the laser beam L1 with which the side end surface of the first fiber-reinforced resin layer 31 is irradiated in the resin removing step. Specifically, the laser control unit 54 controls the laser oscillator 51 such that a laser output in the electrode curing step is lower than a laser output in the resin removing step. Further, according to need, the laser control unit 54 controls the motor 53 such that a laser scanning speed in the electrode curing step is higher than a laser scanning speed in the resin removing step. For example, the energy per unit area of the laser beam L2 used in the electrode curing step is set to such energy that even when the laser beam L2 contacts the carbon fiber, and the carbon fiber increases in temperature, the temperature of the carbon fiber does not reach the thermal decomposition temperature of the carbon fiber. Therefore, in the electrode curing step, the laser beam L2 may contact the resin outside the electrically conductive inks 141, 142, and 143. Thus, the work in the electrode curing step can be simplified.

According to the producing method explained above, without deteriorating the fiber-reinforced resin of the plate spring 10, the electrode pairs $E_0$, $E_{1F}$, $E_{2F}$, $E_{1R}$, and $E_{2R}$ which do not vary can be easily formed and can be stably brought into electrically conductive contact with the carbon fibers. Therefore, the electrode-equipped plate spring 10 mounted on the railcar bogie and made of the fiber-reinforced resin can be produced with stable quality.

The present invention is not limited to the above-described embodiment, and modifications, additions, and eliminations may be made with respect to the configuration of the present invention. In the present embodiment, the electrode forming step includes the electrode applying step and the electrode curing step. However, for example, in the electrode forming step, the electrode may be formed at the plate spring by plating. Further, resin having the light absorption property may be used as the resin of the fiber-reinforced resin to which the electrode is attached. To be specific, the carbon fibers may be exposed by removing the light-absorbing resin by the thermal decomposition caused by the laser beam. One example is that: by adding a coloring agent to transparent resin (for example, epoxy resin), the resin is made nontransparent and colored; and the resin absorbs the laser beam to be thermally decomposed.

REFERENCE SIGNS LIST 1 bogie
10 plate spring
50 laser device
141 to 143 electrically conductive ink (electrically conductive material)
$E_0$, $E_{1F}$, $E_{2F}$, $E_{1R}$, $E_{2R}$ electrode pair
X exposed region

The invention claimed is:

1. A method of producing an electrode-equipped plate spring of a railcar bogie,
the method comprising:
a resin removing step of partially irradiating a surface of fiber-reinforced resin, prepared by including electrically conductive fibers in resin, of a plate spring with a laser beam to partially remove the resin and partially expose the electrically conductive fibers; and
an electrode forming step of attaching an electrode to an exposed region formed by partially exposing the electrically conductive fibers of the fiber-reinforced resin.

2. The method according to claim 1, wherein the resin has a light transmission property, and the electrically conductive fibers have a light absorption property.

3. The method according to claim 1, wherein the resin has a light absorption property.

4. The method according to claim 2, wherein in the resin removing step, the laser beam scans in an extending direction of the electrically conductive fibers when viewed from an irradiation direction of the laser beam.

5. The method according to claim 1, wherein in the electrode forming step, the electrode is formed in such a manner that:
a thermosetting electrically conductive material is applied to the exposed region; and the electrically conductive material is irradiated with the laser beam to be cured.

6. The method according to claim 5, wherein the common laser device for irradiation of the laser beam is used in the resin removing step and the electrode forming step.

7. The method according to claim 5, wherein energy per unit area of the laser beam with which the electrically conductive material is irradiated in the electrode forming step is smaller than energy per unit area of the laser beam with which the fiber-reinforced resin is irradiated in the resin removing step.

8. The method according to claim 1, wherein in the electrode forming step, one middle electrode pair and two side electrode element pairs are formed at one of longitudinal direction sides of the plate spring and at the exposed region formed on both side surfaces of the plate spring, the two side electrode element pairs being arranged at both respective sides of the middle electrode pair in a longitudinal direction of the plate spring so as to be spaced apart from the middle electrode pair.

* * * * *